Patented Nov. 25, 1924.

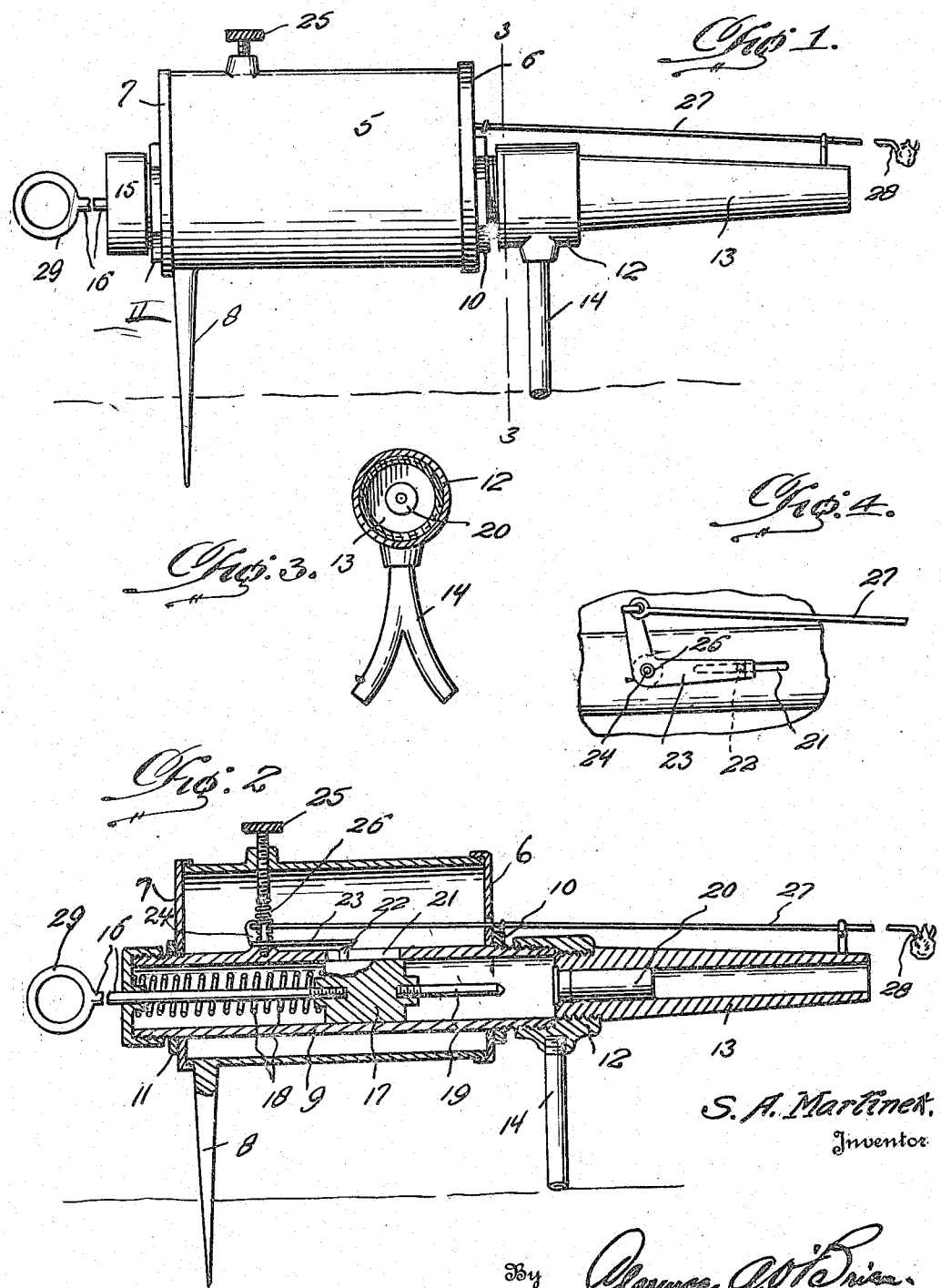

1,517,085

UNITED STATES PATENT OFFICE.

STEVEN A. MARTINEK, OF ROSSVILLE, KANSAS.

TRAP GUN.

Application filed November 22, 1923. Serial No. 676,345.

*To all whom it may concern:*

Be it known that I, STEVEN A. MARTINEK, citizen of the United States, residing at Rossville, in the county of Shawnee and State of Kansas, have invented certain new and useful Improvements in Trap Guns, of which the following is a specification.

This invention relates to certain new and useful improvements in trap guns particularly adapted for exterminating animals.

The primary object of the invention is to provide a trap gun of the above kind which embraces the desired qualities of simplicity and durability of construction, as well as efficiency in operation.

Another object of the invention is to provide a trap gun which may be fired by the animal exerting either a pulling or pushing movement upon the bait.

A further object of the invention is to provide a trap gun which may be continuously used in the open country subject to the elements without readily becoming inoperative or unreliable in operation.

A still further object of the invention is to construct a trap gun of the above kind whereby the same may be cheaply and easily manufactured and assembled, as well as taken apart for renewal or repair purposes with regard to its parts.

Other objects will appear as the nature of the invention is better understood, and the same consists in the novel form, combination, and arrangement of parts hereinafter more fully described, shown in the accompanying drawings and claimed.

In the drawings, wherein like reference characters indicate corresponding parts throughout the several views:

Figure 1 is a side elevational view of a trap gun constructed in accordance with the present invention.

Figure 2 is a substantially central longitudinal sectional view thereof.

Figure 3 is a transverse sectional view taken substantially upon the line 3—3 of Figure 1, and Figure 4 is a fragmentary plan view showing details of the plunger releasing mechanism.

Referring more in detail to the drawings, the present invention embodies a substantially cylindrical casing 5 having removable closure caps 6 and 7 upon the ends thereof, and provided upon the bottom of its rear end portion with a depending pointed post or relatively large and long spur 8, by means of which this end of the casing may be effectively supported at the required distance above the ground surface, and whereby the trap is immovably held against accidental displacement when said pointed post is forced for a partial distance into the ground as shown in Figures 1 and 2.

The closure caps 6 and 7 of the casing 5 are provided with aligned openings below the longitudinal center thereof and extending thru the casing and projecting through these openings in the caps 6 and 7 is a cylinder 9 that has its projecting ends externally threaded for reception of lock nuts 10 and 11, that are screwed tight against the outer surfaces of the caps 6 and 7 for rigidly securing the cylinder 9 in place.

A reducing coupling 12 is threaded onto the forward or front end of the cylinder 9 and has one end of a barrel 13 threaded into the smaller portion thereof, whereby said barrel may be readily removed for removing the shell of a fired cartridge and for inserting a new cartridge in place from time to time as found necessary. This also enables the use of different forms of reducing couplings 12 whereby different sizes of barrels may be employed for adapting the device for use with cartridges of various calibers. For supporting the forward end of the casing 5 and parts carried thereby including the cylinder 9 and barrel 13, at the desired elevation above the ground and preferably horizontal, the reducing fitting 12 is provided with a supporting post or leg 14 that may be of substantially inverted Y shape as shown in Figure 3, so as to have a two point contact with the surface of the ground and that may be removably secured to the fitting 12 as indicated in Figure 2.

The inner end of the cylinder 9 is closed by means of a screw cap 15 that has a central opening through which a rod 16 slidably extends, and the inner end of this rod 16 is detachably and centrally secured to a plunger 17 that is normally urged toward the inner end of the barrel 13 by means of a helical compression spring 18 disposed between the cap 15 and plunger 17 and surrounding the inner end of the rod 16. The plunger 17 has a removable and adjustable firing pin 19 centrally secured to its forward end in position to engage the priming cap of the cartridge 20 disposed in the inner end of the barrel 13, when the plunger 17 is projected under the influence of the spring 18.

A longitudinal elongated slot 21 is provided in the top of the central portion of the cylinder 9 and a lug 22 that is rigid with the plunger 17 projects upwardly through this slot in position to be engaged by the hooked end of a catch 23. The catch 23 is of substantially bell crank form in top plan, and centrally mounted upon a vertical axis as at 24 upon the top of the cylinder 9 and rearwardly of the slot 21 for horizontal swinging movement whereby said catch may be swung into or out of engagement with the lug 22 when moved in either direction. A vertical adjusting screw 25 is threaded through the top of the casing 5 and bears upon the upper end of a compression spring 26 that surrounds the pivot 24 of the catch 23 and bears upon the latter. By adjusting the screw 25, the strands of the spring 26 may be adjusted and the friction between the catch 23 and its support thereby regulated for determining the amount of strength necessary for swinging the catch 23 to its released position. This adjustment will depend upon the character of the animal to be trapped and his particular strength, but the adjustment will always be sufficient to prevent release of the catch 23 by jarring or the like.

Attached to the laterally extending arm of the catch 23 is a relatively stiff rod 27 that extends through an opening in the front cap 6 of the casing 5 above the cylinder 9, and this rod extends to a point forwardly of the barrel 13 where it is provided with a hook or the like as at 28, whereby the bait may be suspended in front of the barrel. The plunger 17 is retracted against the action of the spring 18 for engaging its lug 22 behind the catch 23 by means of a finger piece or ring 29 formed upon the free end of the rod 16.

In operation, the plunger 17 is retracted to engage the lug 22 behind the catch 23 as shown in Figure 2. When the animal attempts to remove the bait upon the hook 28, he will be positioned in front of the barrel 13 and a pull or push will be exerted upon the rod 27, either of which will result in swinging the catch 23 to disengage the same from the lug 22. When this takes place, the spring 18 acts to impel the plunger 17 forwardly so that the firing pin 19 will strike the priming cap of the cartridge 20 for firing the latter whereby the animal will be shot.

From the above description, it is believed that the construction and operation as well as the advantages of the present invention will be readily understood and appreciated by those skilled in the art.

Minor changes may be made without departing from the spirit and scope of the invention as claimed.

What I claim as new is:

1. In a trap gun of the character described, a cylinder having a spring pressed plunger slidably mounted therein and provided with a fixed firing pin, a cartridge barrel coupled to one end of the cylinder and toward which the plunger is normally urged, means including a horizontally swinging catch for releasably holding the plunger in retracted position and adapted to be swung in either direction for releasing the same from the plunger, and means including a bait holding rod for operating said catch, said bait holding rod having bait holding means in front of the barrel.

2. In a trap gun of the character described, a cylinder having a spring pressed plunger slidably mounted therein and provided with a fixed firing pin, a cartridge barrel coupled to one end of the cylinder and toward which the plunger is normally urged, means including a horizontally swinging catch for releasably holding the plunger in retracted position and adapted to be swung in either direction for releasing the same from the plunger, means including a bait holding rod for operating said catch, said bait holding rod having bait holding means in front of the barrel, the coupling means between the barrel and the cylinder comprising a reducing fitting detachably engaging the barrel and the cylinder.

3. In a trap gun of the character described, a cylinder having a spring pressed plunger slidably mounted therein and provided with a fixed firing pin, a cartridge barrel coupled to one end of the cylinder and toward which the plunger is normally urged, means including a horizontally swinging catch for releasably holding the plunger in retracted position and adapted to be swung in either direction for releasing the same from the plunger, means including a bait holding rod for operating said catch, said bait holding rod having bait holding means in front of the barrel, the coupling means between the barrel and the cylinder comprising a reducing fitting detachably engaging the barrel and the cylinder, means to support the barrel and cylinder in a horizontal position including a supporting post carried by said fitting, a casing surrounding the cylinder and rigidly supporting the latter, said catch being arranged within the casing, and said supporting means comprising a post carried by the casing.

4. In a trap gun of the character described, a cylinder having a spring pressed plunger slidably mounted therein and provided with a fixed firing pin, a cartridge barrel coupled to one end of the cylinder and toward which the plunger is normally urged, means including a horizontally swinging catch for releasably holding the plunger in retracted position and adapted to be swung in either direction for releasing the same from the plunger, means including a bait holding rod for operating said catch, said bait holding rod having bait holding means in front of the barrel, a casing surrounding the cylinder and through the ends of which said cylinder projects, and means carried by the casing and associated with the catch for adjustably placing frictional resistance to pivotal movement of the catch.

5. In a trap gun of the character described, a cylinder having a spring pressed plunger slidably mounted therein and provided with a fixed firing pin, a cartridge barrel coupled to one end of the cylinder and toward which the plunger is normally urged, means including a horizontally swinging catch for releasably holding the plunger in retracted position and adapted to be swung in either direction for releasing the same from the plunger, means including a bait holding rod for operating said catch, said bait holding rod having bait holding means in front of the barrel, a casing surrounding the cylinder and through the ends of which said cylinder projects, and means carried by the casing and associated with the catch for adjustably placing frictional resistance to swinging movement of the catch, and a pointed post depending from the casing for supporting the cylinder at one end, said barrel and cylinder being detachably coupled by a fitting, and a supporting post carried by said fitting for supporting the other end of the cylinder.

In testimony whereof I affix my signature.

STEVEN A. MARTINEK.